UNITED STATES PATENT OFFICE.

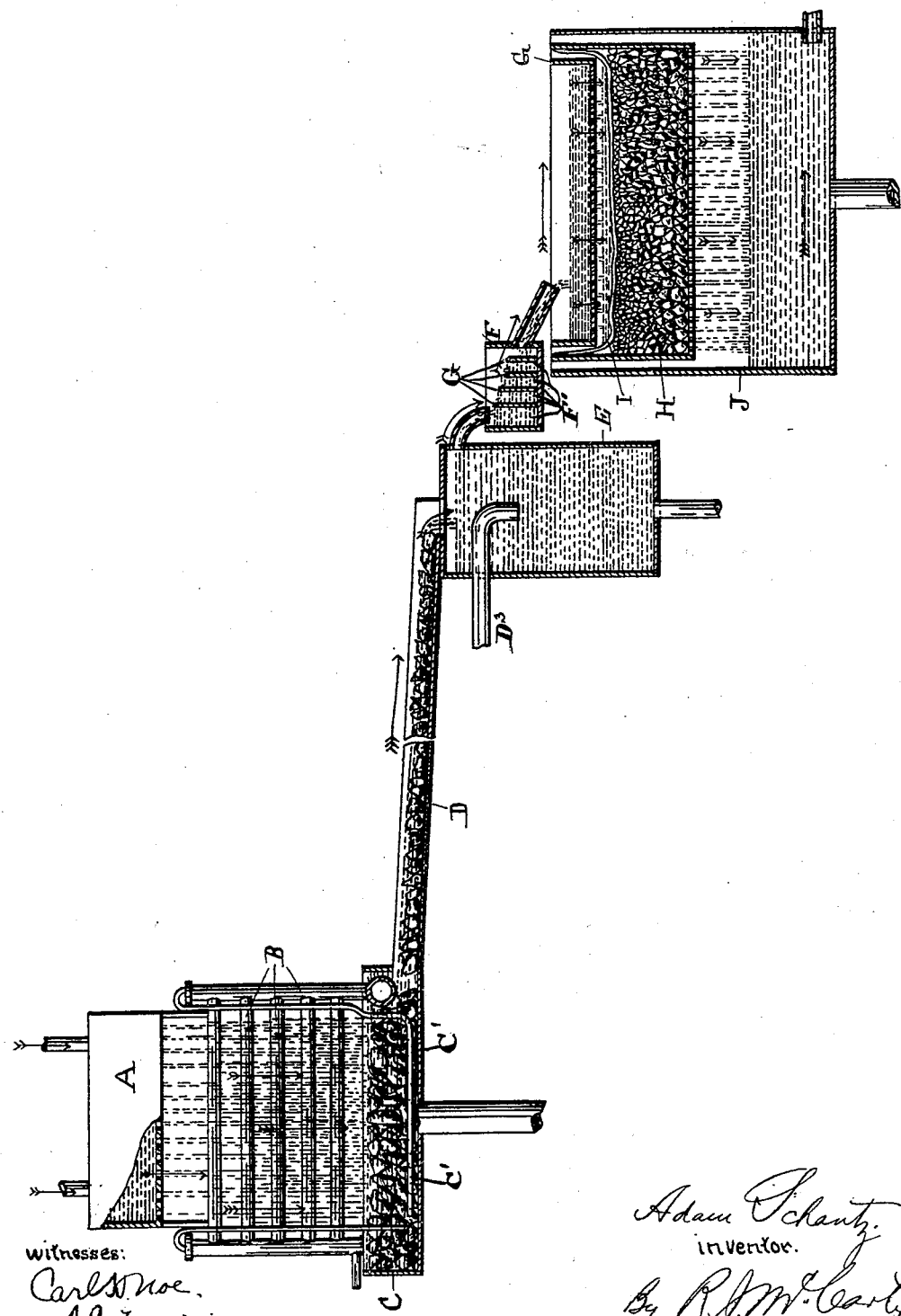

ADAM SCHANTZ, OF DAYTON, OHIO.

METHOD OF PURIFYING WATER.

SPECIFICATION forming part of Letters Patent No. 645,190, dated March 13, 1900.

Application filed December 11, 1899. Serial No. 739,888. (No specimens.)

*To all whom it may concern:*

Be it known that I, ADAM SCHANTZ, a citizen of the United States, residing at Dayton, in the county of Montgomery and State of Ohio, have invented certain new and useful Improvements in Methods of Purifying Water; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to a new method of water filtration and purification by means of which mineral salts and other impurities are separated from the water and the same is obtained in a proper condition and in large quantities for various uses. Means for carrying out said method are shown and described in Letters Patent No. 638,421, granted to myself December 5, 1899.

In those sections where water is strongly impregnated with lime, magnesia, and other mineral substances much trouble and expense are experienced in the use of such water in the art of brewing, as well as other arts, in boiler use, and also for domestic uses. The method to which the water (coming from the wells deeply ladened with lime, magnesia, and other mineral salts) is subjected consists in a series of steps or treatments, hereinafter fully described, which in a short space of time, possibly less than five minutes, will relieve a large volume of such water of a great percentage of such impurities, possibly seventy-five per cent. or over.

Referring to the annexed drawing, the water at the first stage of the process is changed from a body in tank A into a spray or shower and is caused to fall in said spray or shower onto hot pipes B, whereby it is quickly given a high temperature. The temperature the water receives from contact with said pipes is something above 160° Fahrenheit. From the banks of hot pipes the water is caused to fall in a continuous sprinkle or shower onto beds of boulders or rocks in tank C. The said boulders are quickly heated to a corresponding temperature as the water falls thereon and are maintained at such temperature by the constant falling of the heated water thereon. I have found in practice that boulders partaking of a limestone nature have a great affinity or attracting power for the lime, which largely predominates in the water, and when such boulders are given a high temperature the power of attraction and adhesion is considerably increased, and the result is a very large proportion of the lime is separated from the water and caused to deposit thereon. After the water strikes the boulders in hot showers it is constantly agitated within the open tank containing the boulders by jets of steam injected therein through steam-pipes C' and is conveyed through a long shallow gutter D, lined throughout its bottom with small boulders and gravel, over which the water flows in ripples constantly exposed to the air. The water passing through this shallow passage strikes a colder atmosphere, and the impurities quickly precipitate or settle on the said boulders and gravel. The accumulations of lime on said boulders and gravel increase the powers of attraction and adhesion. In other words, as the lime increases in deposit the boulders and gravel become more potent as a means of attracting a large percentage of the lime contained in the water. The water is conducted from the aforesaid trough into an auxiliary steam-tank E, wherein it is given a higher degree of temperature than it obtained heretofore, steam being injected into said tank through a pipe $D^3$. I have found that good results are obtained by imparting to said water at this stage of the process a temperature of 212° Fahrenheit. From this last-named heating-tank the water is discharged by means of troughs G, overflowing in a continuous spray or shower onto a filter-bed H, consisting of gravel, over the top of which is placed a filter-cloth I. The troughs G are fed from a tank F, which receives the water from the steam-tank E, the water passing over barriers F'. Through these filtering mediums the water percolates into a spacious chamber or receiving-tank J below, which is supplied with a free circulation of air, which is heated in said tank by the hot vapor arising from the water. The air coming in contact with the filtered water as it falls from the filter-bed in a spray, the said water is thoroughly aerated. By thus raising the water the second time to a high temperature and discharging it onto a filter-bed in the form of a continuous spray or shower substantially all the lighter impurities are separated from the water.

An analysis of the water is given below. Under "A" is shown the condition of the water as it comes from the wells. Under "B" is shown the condition of the same water when taken from the final receiving-tank J.

|  | A. | B. |
|---|---|---|
| Total residue | 45.80 parts | 20.20 parts. |
| Loss by calcination | 5.40 parts | 3.80 parts. |
| Residue after calcination | 40.40 parts | 16.40 parts. |
| Lime | 13.20 parts | 1.40 parts. |
| Magnesia | 5.90 parts | 3.04 parts. |
| Sulfuric acid | 5.50 parts | 3.02 parts. |
| Chlorin | 4.43 parts | 2.84 parts. |
| Nitrous acid | Large traces | None. |
| Ammonia | Traces | None. |

The organic substances require:

|  | A. | B. |
|---|---|---|
| Oxygen | 0.28 parts | 0.16 parts. |
| Iron | Traces | Traces. |
| Temporary hardness | 18.7° engl | 7.3° engl. |
| Permanent hardness | 7.10° engl | 3.2° engl. |
| Total hardness | 26.8° engl | 10.5° engl. |

Having described my invention, what I claim, and desire to secure by Letters Patent, is—

1. The method of purifying water containing mineral salts, consisting in rapidly heating the water while in a spray or shower, in precipitating said heated spray or shower onto beds of boulders which are heated thereby and maintained at a high temperature, in agitating the water after it falls on said boulders, and in passing the water while in said agitated condition through a shallow gutter having its bottom lined throughout with boulders and gravel, whereby the heavier mineral substances are separated from the water, substantially as set forth.

2. The method of purifying water containing mineral salts consisting in subjecting the water in a form of a continuous spray or shower, to contact with hot bodies whereby a high temperature is quickly given said water, in subjecting said water in heated showers, to contact with boulders whereby said boulders are given a high temperature and are so maintained, in agitating said water by means of jets of steam after contact with the boulders, in passing said water through a shallow gutter containing boulders and gravel and in contact with the air, during which period the heavier impurities are separated, in heating said water to a boiling-point as it discharges from said gutter, and in finally delivering said water, at the last-named temperature, onto a filter-bed through which it passes to an air-chamber wherein it becomes thoroughly aerated, substantially as set forth.

In testimony whereof I affix my signature in presence of two witnesses.

ADAM SCHANTZ.

Witnesses:
JOHN M. SPRIGG,
R. J. McCARTY.